No. 729,332. Patented May 26, 1903.

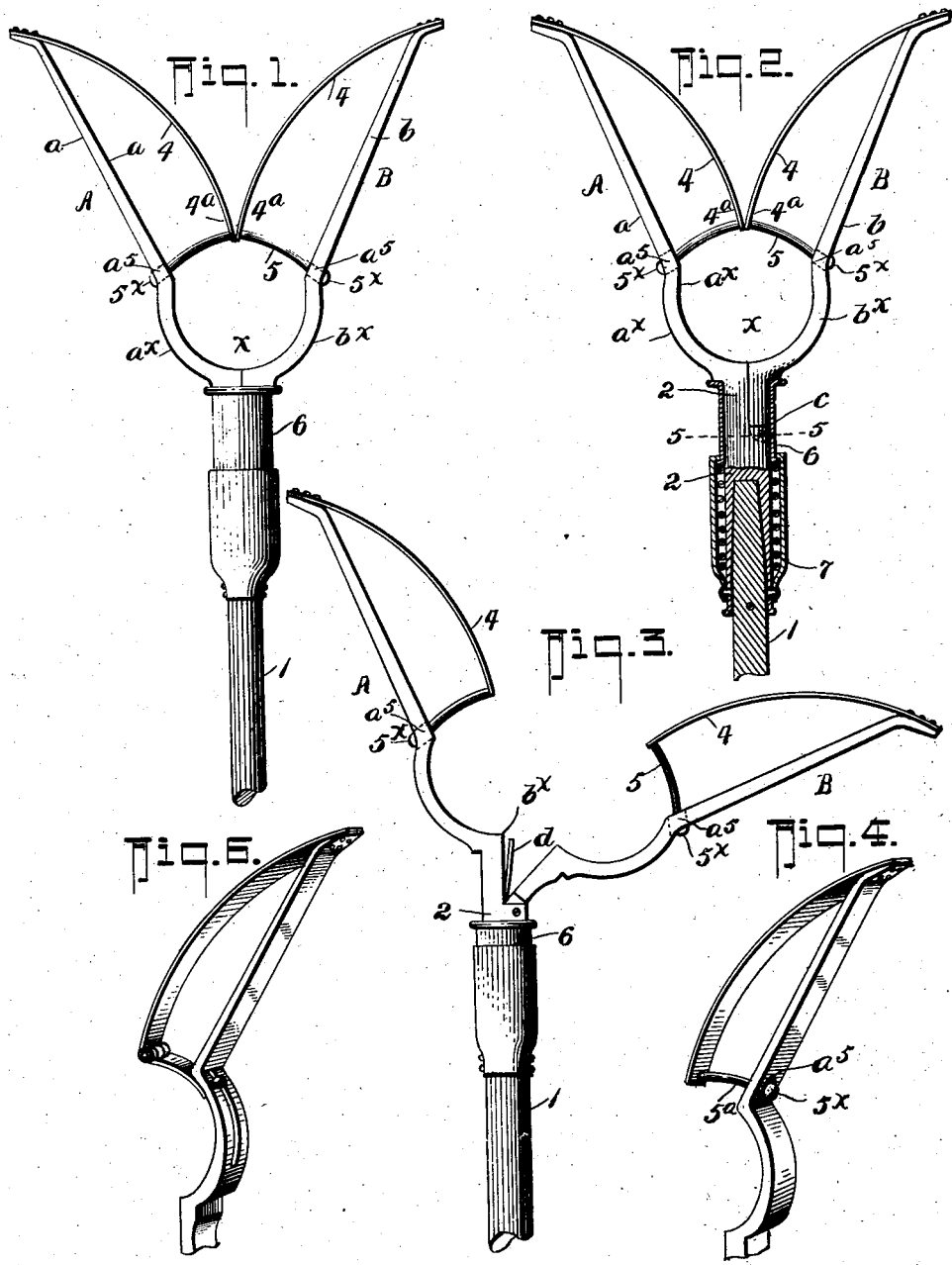

UNITED STATES PATENT OFFICE.

FRANK C. GUSS, OF ST. LOUIS, MISSOURI.

ANIMAL CATCHING AND HOLDING DEVICE.

SPECIFICATION forming part of Letters Patent No. 729,332, dated May 26, 1903.

Application filed July 21, 1902. Serial No. 116,402. (No model.)

*To all whom it may concern:*

Be it known that I, FRANK C. GUSS, residing at St. Louis, in the State of Missouri, have invented a new and Improved Animal Catching and Holding Device, of which the following is a specification.

My invention relates to improvements in that type of animal-catching appliances including a closable jaw mounted upon the end of a pole and adapted to automatically close onto the animal's leg when brought in contact therewith; and it primarily has for its purpose to provide a device of this character of a very simple and inexpensive construction, capable of being easily manipulated, and which when brought into engagement with the animal will not injure the leg or be painful in its application thereto.

In its generic nature my invention comprises a pole, the outer end of which has the shape of a shepherd's crook and which carries a pair of jaws whose opposing faces provide a forked or converging way, whereby the same may be conveniently guided onto the leg of the animal and which are yieldingly supported to spring over the animal's leg and automatically close thereover.

In its more complete nature my invention consists in a pole having a fixed jaw, a hinged jaw for opposing the fixed jaw, the two jaws diverging from the pole and terminating at the pole end in a semicircular seat, and a combined spring-guide and clasp for each jaw, each joined at the outer end to its respective jaw and having portions curved to oppose the semicircular seat at the pole end, whereby to provide a pocket for encircling the leg of the animal, said combined guide and clasp members also having a novel slidable connection with the jaws, whereby to sustain them in their proper relative positions during the lateral movement of the hinged jaw and the passing of the guide and clasp members over the leg of the animal.

In its more subordinate features my invention also includes certain novel details of construction and peculiar combination of parts, all of which will hereinafter be fully explained, and specifically pointed out in the appended claims, reference being had to the accompanying drawings, in which—

Figure 1 is a perspective view of my invention. Fig. 2 is a side elevation of the end of a pole with my improvements applied, the jaws being shown closed and parts in section to show the ferrule-actuating spring devices hereinafter referred to. Fig. 3 is a similar view, the hinge-jaw being shown swung open. Fig. 4 is a detail perspective view of a portion of the hinged jaw with its combined attached guide and clasp member. Fig. 5 is a cross-section taken practically on the line 5 5 of Fig. 2. Fig. 6 is a view of a modified form of jaw hereinafter explained.

In the practical construction my invention embodies a pole 1, with which the fixedly-held jaw, presently referred to, may be an integral part; but to provide for using a detachable pole the two jaws A and B are connected to a socket-piece 2, of metal, provided with the fixedly-held jaw A and having means for properly sustaining the hinged jaw B.

The two jaws A and B consist of the divergingly-held members $a\ b$, one of which, $a$, is shown as an integral part of the socket 2, and the other, $b$, is connected to said socket by a dovetailed or other suitable hinged connection $c$, so that under certain conditions the jaw B will swing outward from the jaw A to the position shown in Fig. 3, and to positively throw the said jaw B to its open position a flat spring $d$ is fixed to that face of the jaw A against which the face $b^\times$ of the jaw abuts when the two jaws are in their closed position. The two jaws are relatively supported to provide a forked or diverging way to facilitate pushing the device into an operative position on the leg of the animal to be caught, and the parts $a^\times\ b^\times$ of the two jaws merging with the socket 2 are curved to form a semicircular seat $x$, the purpose of which will be presently explained.

To the outer end of each jaw is fixedly secured a flat spring-plate 4 4, which curves inwardly and forms opposing sides that converge and abut at their inner ends $4^a\ 4^a$ when the jaws are closed, as clearly shown in Fig. 2, by referring to which it will also be noticed to each of the said ends $4^a\ 4^a$ is joined a rod 5, that curves inwardly on substantially the arc of a circle. The two rod members 5 have their outer ends held in engagement with their respective jaws, and their inner ends $5^\times\ 5^\times$ are held to slide through the slots $a^5$ in the portions a and b of the two jaws, and said members 5, in conjunction with the said portions a b of the two jaws, produce a substantially circular clasp adapted to embrace the leg of the animal when placed thereon, and to facilitate the proper movement of the members 5 when the two opposing plates 4 4 are pressed apart during the operation of grasping the leg of the animal the jaw portions a b are provided with elongated slots $a^5$ $a^5$ and the rods with heads $5^\times$ to engage with the said slots, as clearly shown in Figs. 2 and 4.

6 designates a ferrule slidable over the socket-piece 2 and normally forced to its upper or jaw-locking position by a spring 7. (See Fig. 2.) The ferrule when to its normal position (see Fig. 1) encases the hinged end of the jaw B and holds the same firmly locked to oppose the jaw A. When pushed down to a point below the hinged joint, the jaw B is permitted to swing open to the position shown in Fig. 3.

From the foregoing, taken in connection with the accompanying drawings, it is believed the advantages of my invention and the manner of its operation will be clearly understood.

It will be noticed, the two jaws A and B being normally closed to the position shown in Fig. 2, the two members 4 4 form a forked end to fit against the leg of the animal, and in fitting same a slight pressure will cause the members 4 4 to open up and slip over the leg until the circular pocket receives it, when the two plates 4 4 resume their normal position and clasp the leg, the whole forming, as it were, a circular hand for the leg. During the operation of applying the device the jaw B remains as a rigid member, being so held by the ferrule. To release the animal, the ferrule is pulled down below the hinged joint of jaw B, which, by reason of the spring for forcing it outward and the pull of the leg against the part b', the said jaw is swung out to the position shown in Fig. 3.

Slight changes in the details of construction may be made without departing from the scope of the appended claims.

Having thus described my invention, what I claim, and desire to secure by Letters Patent, is—

1. An animal-catcher, comprising a leg-engaging member having a bifurcated end, forming two opposing jaws, and bearing-surfaces for the opposing faces of the jaws, said surface being convergingly secured to the jaws fixedly held at their outer ends to the said jaws, and having their inner ends normally held to abut, the said jaws having a leg-receiving socket in line with the said abutting ends, for the purposes described.

2. An animal-catcher, comprising a pole, a pair of diverging jaws on the end thereof, the inner or apex portion of the jaws being curved to form a leg-receiving pocket, said jaws having yieldable converging opposing faces, whose inner ends abut and terminate centrally of the receiving-pocket, for the purposes described.

3. An animal-catcher, comprising a pole, a pair of diverging jaws on the end thereof, the inner portions of which terminate in a curved pocket, one of the jaws being hinged to swing laterally, means for holding the hinged jaw to its closed position, the opposing faces of the jaws having converging yieldable portions that abut at a point centrally of the curved pocket, substantially as shown and for the purposes described.

4. In an animal-catcher, as described, the combination with the pole having forked jaws, whose converging ends are curved to form a circular pocket; of the plates 4 4, fixedly secured at one end to the jaws, said plates being curved inwardly and having their free ends held to abut at a point in line with the circular pocket, and the rods 5 5 secured to the abutting ends of the plate 4, and having their free ends slidable through the aforesaid forked jaws, for the purposes specified.

5. The combination with the pole; of a socket-piece having diverging jaws, the inner or converged portions of which are curved on the arc of a circle, said curved portions each having an elongated slot, the spring-plates 4 4 fixedly secured to the outer ends of the jaws, their inner ends abutting at a point midway the curved portions of the two jaws, the rods 5 secured to the free ends of the plates 4, said rods 5 being curved on a circle and opposing the curved part of the jaws, and means on the free ends of the rods 5 for slidably engaging the slots in the said curved portions of the jaws, all being arranged substantially as shown and described.

6. As a new article, an animal-catcher, comprising in combination, with the socket having a pair of diverging jaws, one of which is hinged to swing laterally, means for forcing it to its outer position and a sliding ferrule for holding it to its closed position, the inner portion of the two jaws being curved on the arc of a circle, and provided with elongated slots; of the spring-plates 4 4 convergingly disposed between the two jaws with their free ends normally abutting and the curved rods 5 secured to the free ends of the plates 4 4, the free ends of the rods 5 being held to engage the inner faces of the curved portions of the jaws and having a guiding means for engaging the slots in the said curved portions, all being arranged substantially as shown and for the purposes described.

FRANK C. GUSS.

Witnesses:
W. G. PADDOCK,
FRANK P. FORD.